United States Patent [19]

Logsdon et al.

[11] 4,112,718
[45] Sep. 12, 1978

[54] LINK-SUPPORTED INSTRUMENT PANEL GUARD

[75] Inventors: John S. Logsdon, Chillicothe; George H. Meiner, III, Morton, both of Ill.

[73] Assignee: Caterpillar Tractor Co., Peoria, Ill.

[21] Appl. No.: 823,300

[22] Filed: Aug. 10, 1977

[51] Int. Cl.² .............................................. B60K 37/00
[52] U.S. Cl. ......................................... 70/159; 180/90
[58] Field of Search ......... 70/159, 239, 246, DIG. 56, 70/DIG. 58, 160, 161, 162; 180/90; 296/70; 220/333

[56] References Cited

U.S. PATENT DOCUMENTS

| | | | |
|---|---|---|---|
| 2,529,478 | 11/1950 | Bach | 220/333 |
| 3,557,897 | 1/1971 | Conner | 180/90 |
| 3,814,205 | 6/1974 | Miller | 180/90 |
| 3,841,431 | 10/1974 | Russey | 180/90 |
| 3,913,701 | 8/1973 | Williams | 180/90 |

Primary Examiner—J. Franklin Foss

Attorney, Agent, or Firm—Wegner, Stellman, McCord, Wiles & Wood

[57] ABSTRACT

A protective guard assembly for the instrument panel of an operator's console has a vandalism-proof cover which is supported for movement between a storage position over the console and a closed position over the instruments by sets of swing links. The swing links are of different length to provide different movement paths for the upper and lower ends of the panel cover. The cover upper end swings along a relatively flat arc into and out of the storage position and the lower end swings just in front of the instrument panel from above the console to over the lower edge of the instrument panel. Space required for movement of the cover does not encroach upon the space usually occupied by the vehicle operator. Links at opposite sides of the panel cover are connected by a torque rod to prevent binding as the panel cover is moved. The panel cover is designed to interfere with an ignition key inserted into the instrument panel, but not with instruments which project from the panel.

10 Claims, 4 Drawing Figures

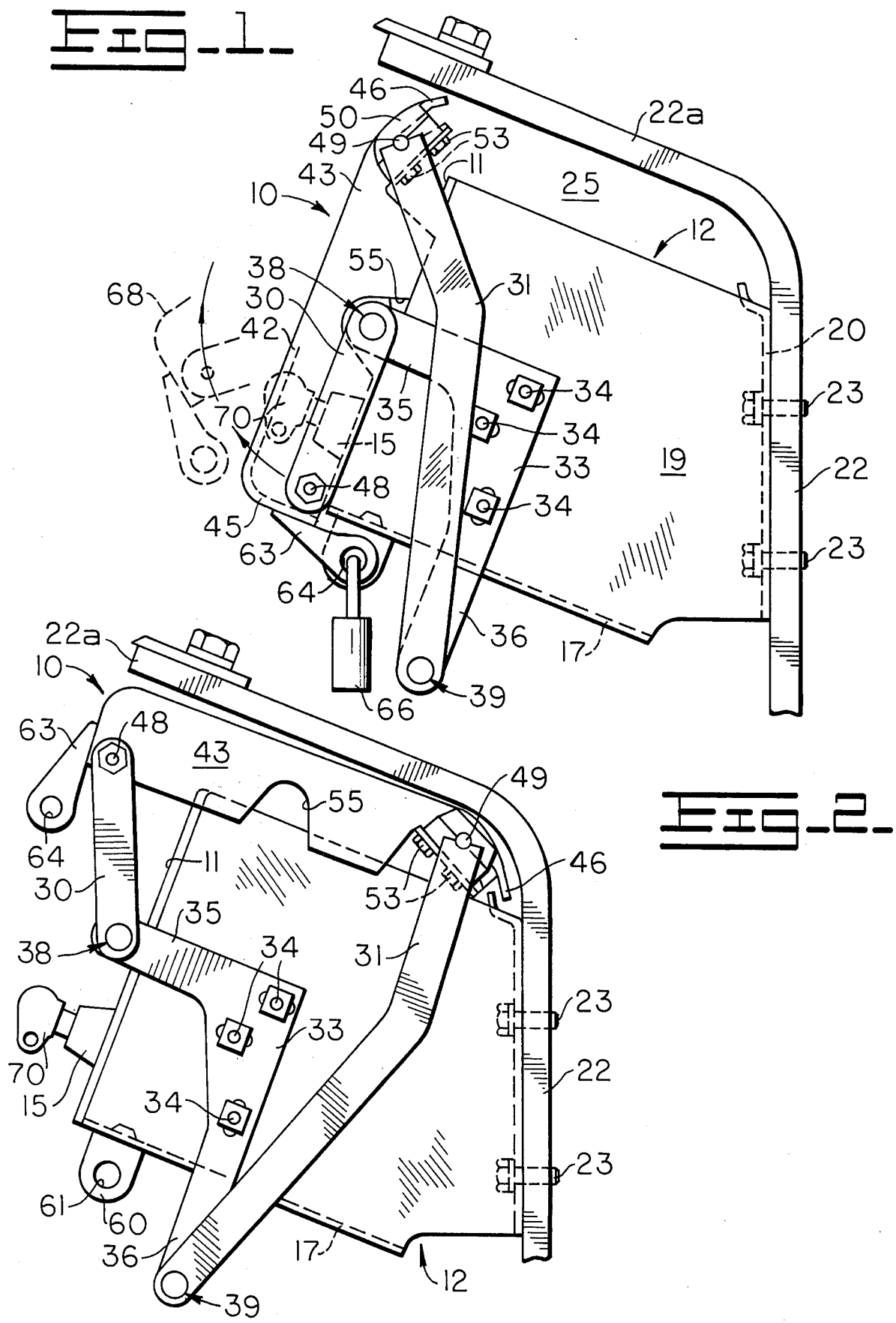

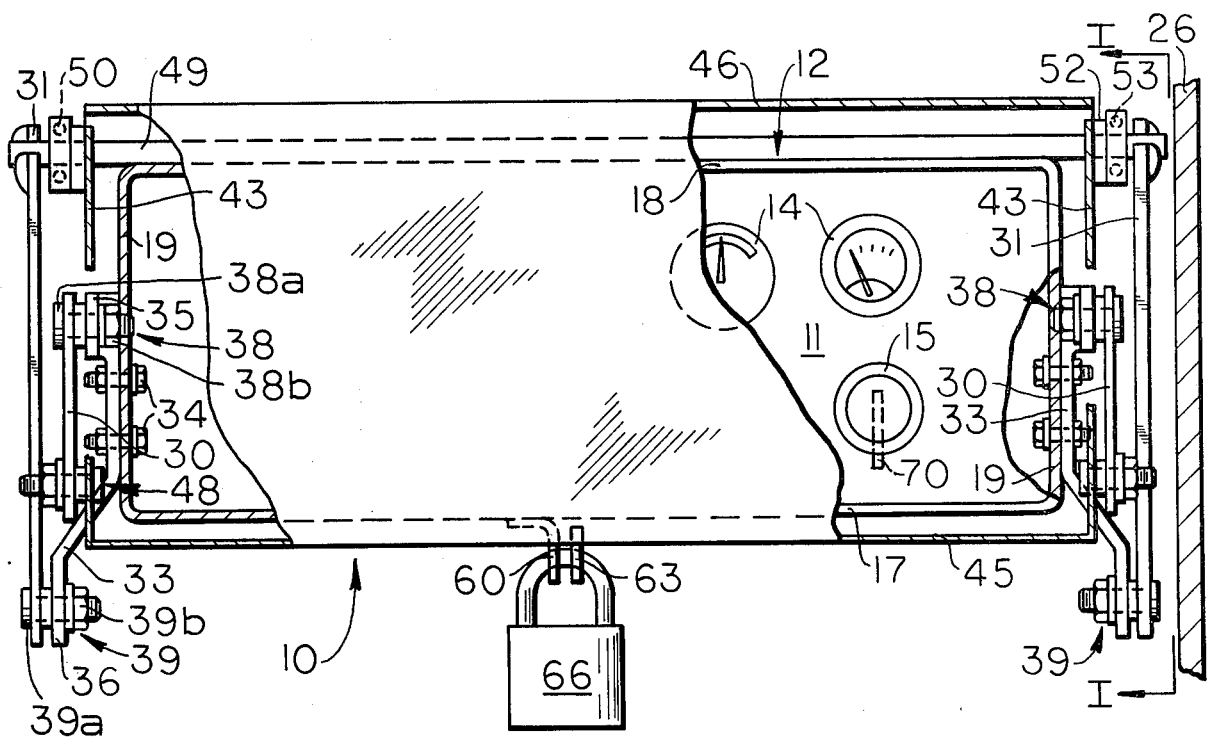
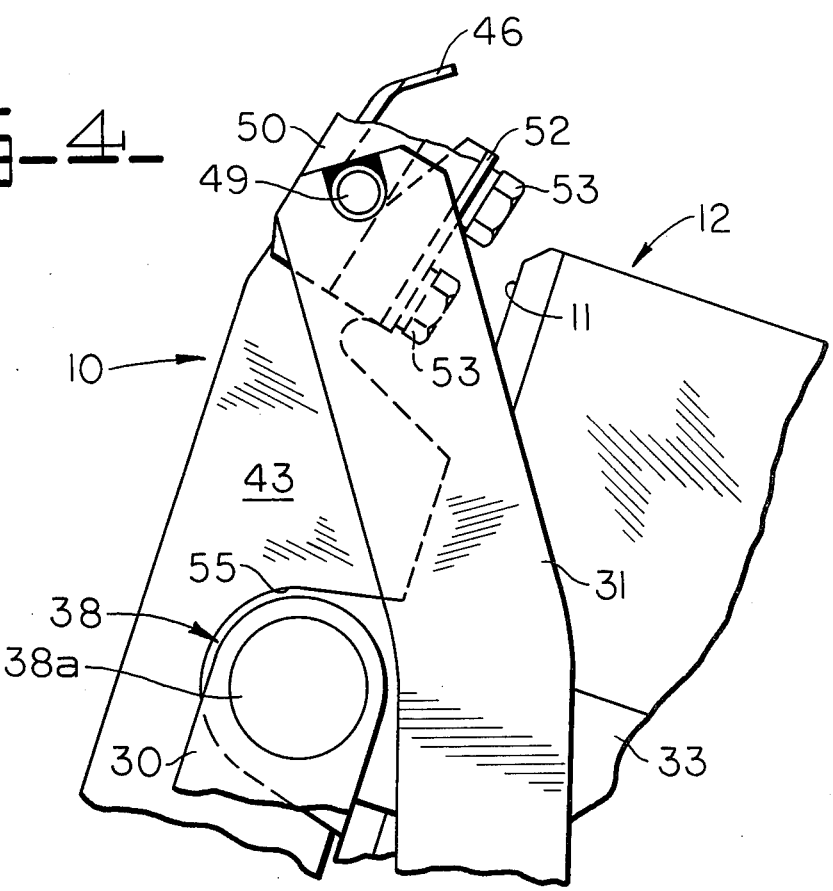

LINK-SUPPORTED INSTRUMENT PANEL GUARD

BACKGROUND OF THE INVENTION

This invention relates to an instrument console guard for industrial equipment and the like, and more particularly, to a panel cover that is mounted on swing links of different lengths to provide differential pivoting of the guard between a closed, operative position overlying the operator's console and an open, inoperative position.

Industrial equipment, such as off-the-road earthworking vehicles, often have an open operator's compartment which is subject to vandalism when the vehicle is left unattended at the job site or when parked in remote areas between working periods. Frequently, incidents of vandalism result in unauthorized operation of the vehicle or in breakage or damage of the operating gauges, controls, switches and similar instruments on the operator's console. Because proper functioning of the instruments on the console is necessary for proper operation of the vehicle, even minor damage necessitates the replacement or repair of the damaged instruments thereby rendering the vehicle inoperative and seriously reducing the productivity of the vehicle.

Instrument console guards have been developed and are often effective to protect the console when they are employed. Such guards or covers are generally effective in resisting destructive blows by rocks and other job site debris and in limiting access to the instrument console. However, many such covers are bulky and cumbersome and often cannot be operated unless the operator leaves the operator's station. Therefore, if such covers cannot conveniently be manipulated between open and closed positions, use by the operator is discouraged.

In addition, such covers do not always encourage removal of the ignition key when the vehicle is parked. Obviously, removal of the ignition key substantially discourages unauthorized use of the vehicle.

Conseqeuntly, it is evident that there is a need for a protective instrument cover which would be both convenient and functional, which would not interfere with the operator during nonuse, and which would encourage the operator to employ the cover to protect the instrument console whenever the vehicle is to be left unattended.

SUMMARY OF THE INVENTION

The present invention is directed to overcoming one or more of the problems as set forth above.

According to the present invention, a protective guard assembly or panel cover for an instrument console is pivotally supported upon coacting swing links of different lengths that afford differential pivoting action so that the cover travels through a relatively flat arc from an inoperative, open position within a storage space above and overlapping the instrument console to an operative, closed position enclosing the instrument panel of the instrument console.

The protective guard assembly has two sets of links at opposite lateral sides of the protective panel cover with one set of links being joined with a torque rod so as to maintain the links on each side of the panel cover moving in unison to prevent binding of the panel cover as it is raised and lowered between open and closed positions, respectively.

The panel cover of the protective guard assembly is configured to define a recessed chamber-like area of shallow dimension so that the ignition key must be removed from the ignition mechanism on the instrument panel to deactivate the electrical circuitry before the panel cover may be completely closed. Otherwise, the key interferes with the panel cover and prevents complete closure and locking of the cover over the instrument console.

BRIEF DESCRIPTION OF THE DRAWINGS

FIG. 1 is a side elevational view of the protective guard assembly taken along line 1—1 of FIG. 3 showing the panel cover in operative, closed position and indicating in phantom the position of the ignition key prior to its removal from the ignition;

FIG. 2 is a side elevational view similar to FIG. 1, but showing the panel cover in its inoperative, open position;

FIG. 3 is a front elevational view of the protective guard assembly, partially broken away, to show the lateral relationship of the connecting swing links and the instrument panel of the operator's console; and FIG. 4 is an enlarged, fragmentary, side elevational view of the trailing edge of the panel guard assembly showing in greater detail the torque rod and one of the split bearings and its connection to the panel cover.

DESCRIPTION OF THE PREFERRED EMBODIMENT

Referring to FIG. 1, the link-supported instrument panel cover guard, generally designated 10, is shown enclosing the instrument panel 11 of an operator's console, generally designated 12. While the instrument panel 11 comprises the front face of the operator's console 12, the instrument panel faces rearwardly relative to the vehicle so that it is positioned forwardly of the vehicle operator.

The instrument panel 12 has a plurality of instruments or guages 14 and an ignition mechanism 15. The instrument console 12 as shown herein is defined by the upright instrument panel 11, a bottom wall 17, a top wall 18, oppositely-disposed spaced side walls, each designated 19, and a rear wall 20. The operator's console 12 is secured to a vertically-extending, forward fire wall 22 by bolts 23 which extend through the console's rear wall 20. The fire wall 22 has an upper portion 22a which extends rearwardly over the operator's console 12 so as to define an open storage space 25 therebetween. Spaced laterally outward from each of the side walls are close-fitting vehicle frame members, one of which is shown and designated 26, which may comprise, the tower used to support a loader linkage for a wheel loader, the lateral external framework of the vehicle, or the like.

Because the linkage assemblies which support and guide the panel cover 10 at each side of the operator's console are similarly constructed, in the interest of brevity and clarity, only one will be described in detail herein. Swing links 30 and 31 may be pivotally mounted to the vehicle by various means. However, for convenience, inverted, L-shaped, mounting brackets 33 are provided so that the links 30 and 31 may be attached to the vehicle through the console 12. Each bracket 33 is externally secured to the respective side walls 19 of the operator's console 12 by bolts 34. The mounting bracket 33 has an offset, upper portion 35, which extends to a point beyond the instrument panel 11 and an offset, lower portion 36 which extends downwardly to a point below the bottom wall 17 of the operator's console 12. The forward link 30 is pivotally secured to the end of the upper portion 35 by a bolt assembly 38. The rearward link 31, which has a length greater than that of the forward link 30, is pivotally secured to the end of the lower portion 36 by bolt assembly 39.

As shown in FIG. 3, the links 30 and 31 are spaced slightly from their common mounting bracket 33 and from each other since the respective upper and lower portions 35 and 36 of the mounting bracket are angled laterally outwardly in differing degree. The lugs 38a and 39a which form a part of the bolt assemblies 38 and 39 are positively secured to the respective link members 30 and 31, as by tack welding, so that in the event that the exposed nuts 38b and 39b are removed, the link members 30 and 31 cannot be deflected from the lugs 38a and 39a to detach the panel cover 10 from the instrument console 12. In any event, the close fitting structural framework 26 would prevent any laterally outward deflection sufficient to provide personal access to the instrument panel 11 and thereby thwart any attempt to get at the panel by disconnecting the support links 30 and 31 from the mounting bracket 33.

The instrument panel cover 10 is formed from sufficiently durable sheet metal and is seen to include a front plate 42, which has dimensions slightly larger than those of the instrument panel 11. The panel cover 10 also includes depending, oppositely disposed side walls, each designated 43, a bottom wall 45 and an arcuate top wall 46 thereby defining a dished vandalism cover having a relatively shallow internal recess. This recess permits the panel 10 to overlie and enclose any instruments which project from the instrument panel 11.

The panel cover 10 is selectively movable between its operative, closed position enclosing the instrument panel 11 of the console 12 (FIG. 1) and an inoperative, open storage position above and overlaying the top wall 18 within the open space 25 (FIG. 2). To facilitate the description of the guard assembly, the area of the panel cover 10 generally adjacent the bottom wall 45 will be designated and referred to herein as the lower end, while the area generally adjacent the top wall 46 will be designated as the upper end. When the panel cover 10 is in closed position, the lower end will lie generally adjacent the bottom edge of the instrument panel 11 and the upper end will lie generally adjacent the upper edge of the instrument panel 11. When the panel cover 10 is in storage position, the lower end will lie generally adjacent the forward edge of the instrument console top wall 18 and the upper end will lie adjacent the rearward edge of the top wall 18.

The swinging end of the forward links 30 are pivotally secured to the lower end of the side wall 43 by lug assemblies 48. The swinging end of the links 31 are joined, as by welding, to a torque rod 49. The torque rod 49 is, in turn, pivotally connected to the upper end of the side wall 43 by a split bearing 50. The split bearings 50 are fixed to each side of the panel cover 10 and pivotally embrace the respective lateral ends of the torque rod 49 at a point adjacent the upper end of the side walls 43. A flange 52 extending outwardly from each side wall 43 provides a means for securing the split bearing 50 to the panel cover 10 by bolts 53. The torque rod 49 is of sufficient diameter to insure transfer of torque loads from one end of the torque rod 49 to the other causing the two larger links 31 to swing in unison. This minimizes any tendency for the panel cover 10 to tilt or cock during elevating or retracting movement.

Because the links 30 are shorter than the coacting links 31, differential controlled swinging action occurs, which causes the upper end of the panel cover 10 to swing along a substantially flatter arc than the lower end. While the lower end of the panel cover 10 must swing outwardly from the instrument panel 11, it will not swing outwardly more than the short links 30 will permit. Similarly, the long links 31 cause the upper end of the panel cover 10 to swing along a relatively shallow arc within the relatively narrow open space 25 above the console. The bolt assemblies 38 and 39 permit the respective links 30 and 31 to swing about their respective fixed pivot points on axes which are horizontal relative to the vehicle. The panel cover 10 is thereby moved to the same position relative to the instrument console 12. The side walls 43 of the cover 10 are configured to define notches 55 fitting closely about but not interfering with the laterally projecting bolt assembly 38 when the panel cover 10 is closed.

It is preferable to lock the panel cover 10 over the instruments 14 against vandalism. Herein this is accomplished by providing a bracket 60 having an aperture 61 externally secured to the bottom wall 17 of instrument console 12. Similarly, a bracket 63 is secured to the bottom wall 45 of the panel cover 10 and has an aperture 64. As seen in FIG. 1, when the panel cover 10 is moved to its closed position to enclose the instrument panel 11, the apertures 61 and 64 will be aligned so as to accept the shackle of a padlock 66 which secures the panel cover 10 in closed position. As seen in FIG. 1, removal of the padlock 66 allows the operator to grasp the lower end of the panel cover 10 and swing it initially outward by clockwise pivoting of the links 30 and 31. Most of the initial movement will affect swinging of the links 30 with much less motion of the links 31. When the panel cover 10 reaches the position indicated in phantom at 68, the reaction force from the upper guard structure is applied to the upper ends of links 31 and connecting torque rod 49 to initiate substantial movement of these slower moving links. Continued elevation of the panel cover 10 simultaneously swings and shifts the panel cover 10 clockwise into the open space 25 as shown in FIG. 2. In its open position (FIG. 2), the panel cover 10 has a center of gravity located to the right of the pivot points represented by the attachment of the link members 30 and 31 to the mounting bracket so that gravity retains the panel cover 10 in open position. The lower end of the panel cover 10 and the bracket 63 will however extend outwardly from the open space 25 to permit easy grasping and lowering of the panel cover 10 to its functional closed protective position.

As seen in FIG. 1, an ignition key 70 which is inserted into the ignition mechanism 15 will extend sufficiently outwardly from the instrument panel 11 such that it will interfere with the panel cover 10 when the panel cover 10 is moved to an operative, closed position. The key 70 must be removed before the panel cover 10 can be secured in place and the padlock 66 inserted through the respective apertures 61 and 64. Removal of the key assures deactivation of the entire electrical circuit which controls operation of the vehicle. The physical relationship of cover to console is such that if the padlock shackle can be properly applied to lock the cover over the console, the operator is assured that the ignition key was removed.

In the locked position of the panel cover 10 over the console front panel 11, it may be noted that the padlock 66 positively locates only the lower end of the panel cover 10 relative to the operator's console 12. The links 30 and 31 however, prevent any movement of the panel cover 31 out of the position shown in FIG. 1. The location of the pivot points 38 and 39 of the links 30 and 31, respectively, to the vehicle or the vehicle through the console, as the case may be, is such that any attempt to pull the panel cover 10 away from the console 12 is prevented by the location of the longer link 31. Any attempt to pull the top of the panel cover 10 away from the console places a tension in the links 31, which they are designed to resist.

The embodiment of the invention in which an exclusive property or privilege is claimed is defined as follows:

1. A vandalism guard for a vehicle control console having an upright front panel containing instruments to be protected comprising:
    a protective cover for enclosing the instrument front panel of the console, said cover being movable between an out-of-the-way storage position above and overlaying the console and an enclosing position over the instrument front panel, the upper and lower ends of said cover being respectively positioned adjacent the top and bottom of the instrument front panel when said cover is moved to said enclosing position;
    a first long link pivotally connecting the upper end of said cover to a pivot base support carried by the vehicle below and rearwardly of the instrument front panel, said first link guiding and controlling swinging movement of the cover upper end between said instrument enclosing and storage positions through a relatively flat arc extending from the upper front panel to the upper rear console;
    a second short link pivotally connecting the lower end of said cover to a pivot base support carried by the vehicle adjacent the instrument front panel intermediate the top and bottom thereof, said second link guiding and controlling swinging movement of the cover lower end between said instrument enclosing and storage positions through a relatively sharp arc extending from the lower front panel to the upper front panel; and
    lock means for securing said cover to the vehicle in enclosing position, said links holding the cover immovable relative to the vehicle when said lock means is engaged.

2. A vandalism guard as specified in claim 1 wherein there are a pair of spaced first links and a pair of spaced second links, a link of each pair being connected at each side of said cover.

3. A vandalism guard as specified in claim 2 further including a torque rod extending laterally across said cover joining one pair of links together to transfer torque loads from one side of said cover to the other.

4. A vandalism guard as specified in claim 3 wherein said first links are joined by said torque rod.

5. A vandalism guard as specified in claim 4 wherein said torque rod is fixedly connected to said first links at each end thereof and further including a pair of bearings carried by said cover one at each side thereof to journal said torque rod and rotatably connect said first links to said cover.

6. The vandalism guard as specified in claim 2 wherein the operator's console is positioned between framework of the vehicle disposed laterally at each side thereof, the operator's console having a lateral dimension less than the distance between said framework so as to define a relatively narrow space at each side between the console and the framework, said links residing generally within the spaces thereby defined.

7. The vandalism guard as specified in claim 2 wherein said first and second links are pivotally connected to the operator's console at each side thereof by bolts passing through said first and second links and held in place by nuts threaded thereon, and further including said means for permanently fixing said bolts to said first and second links whereby said links may not be readily disconnected when said nuts are removed.

8. A vandalism guard as specified in claim 2 further including a bracket fixed to the console adjacent either side thereof, each bracket having a first end portion extending forwardly of the instrument front panel and a second end portion extending downwardly, said first links being pivotally connected to the respective first end portions and said second links being pivotally connected to the respective second end portions.

9. A vandalism guard as specified in claim 1 wherein said cover is configured to define an internal recess within said cover, said recess having a depth great enough so as to permit instruments projecting from the instrument panel of the console to reside in said recess and small enough so that an ignition key remaining in the ignition mechanism located on said instrument panel interferes with the closure of said cover.

10. A vandalism guard for a vehicle control console having an upright front panel containing instruments to be protected comprising:
    a protective cover for enclosing the instrument front panel of the console, said cover being movable between an out-of-the-way storage position above and overlaying the console and an enclosing position over the instrument front panel, the upper and lower ends of said cover being respectively positioned adjacent the top and bottom of the instrument front panel when said cover is moved to said enclosing position;
    a pair of spaced first links one at each side of the cover pivotally connected to the upper end of said cover;
    a pair of spaced second links one at each side of the cover pivotally connected to the lower end of said cover;
    a pair of brackets fixed to the console one adjacent either side thereof, each bracket having a first end portion extending forwardly of the instrument front panel and a second end portion extending downwardly, the operator's console being positioned between framework of the vehicle disposed laterally at each side thereof and having a lateral dimension less than the distance between said framework so as to define a relatively narrow space at each side between the console and the framework in which said links and brackets generally reside;
    bolts passing through said first and second links and held in place by nuts threaded thereon for pivotally connecting said first links to the respective first end portions and said second links to the respective second end portions of said brackets and means provided for permanently fixing said bolts to said first and second links whereby said links may not be readily disconnected when said nuts are removed, said links thereby each guiding and controlling swinging movement of its respective connected end of said cover between said instrument enclosing and storage positions;

a torque rod extending laterally across said cover joining one pair of links together to transfer torque loads from one side of said cover to the other; and lock means for securing said cover to the vehicle in enclosing position, said links holding the cover immovable relative to the vehicle when said lock means is engaged.

* * * * *